(12) United States Patent
Amin

(10) Patent No.: US 10,703,561 B2
(45) Date of Patent: Jul. 7, 2020

(54) KNOCK BOX

(71) Applicant: DOUBLE RIS PTY LTD., Rydalmere, New South Wales (AU)

(72) Inventor: Rison Amin, Rydalmere (AU)

(73) Assignee: DOUBLE RIS PTY LTD., Rydalmere (AU)

( * ) Notice: Subject to any disclaimer, the term of this patent is extended or adjusted under 35 U.S.C. 154(b) by 161 days.

(21) Appl. No.: 15/774,387

(22) PCT Filed: Oct. 25, 2016

(86) PCT No.: PCT/AU2016/051003
§ 371 (c)(1),
(2) Date: May 8, 2018

(87) PCT Pub. No.: WO2017/079787
PCT Pub. Date: May 18, 2017

(65) Prior Publication Data
US 2020/0017293 A1    Jan. 16, 2020

(30) Foreign Application Priority Data

Nov. 12, 2015  (AU) ................................ 2015904665

(51) Int. Cl.
| | |
|---|---|
| *B65F 1/12* | (2006.01) |
| *A47J 31/06* | (2006.01) |
| *A47J 31/60* | (2006.01) |
| *B65F 1/02* | (2006.01) |

(52) U.S. Cl.
CPC ............ *B65F 1/12* (2013.01); *A47J 31/0663* (2013.01); *A47J 31/60* (2013.01); *B65F 1/02* (2013.01); *B65F 2220/106* (2013.01)

(58) Field of Classification Search
CPC .... B65F 1/12; B65F 1/163; B65F 1/16; B65F 1/04; B65F 1/02; A47J 31/0663;
(Continued)

(56) References Cited

U.S. PATENT DOCUMENTS 2,023,399 A * 12/1935 Bullard ................. A01G 23/14
                                                           220/696
3,101,154 A * 8/1963 Herdering .............. B65D 45/16
                                                           220/4.24
(Continued)

FOREIGN PATENT DOCUMENTS

| EP | 0 283 341 | 5/1990 |
| GB | 2485329 | 5/2012 |
| WO | 2005/102125 | 11/2005 |

OTHER PUBLICATIONS

Translation of EP283341B1. AZANCOT. May 16, 1990, Paragraph 10. (Year: 1990).*
(Continued)

*Primary Examiner* — Robert J Hicks
(74) *Attorney, Agent, or Firm* — Nixon & Vanderhye P.C.

(57) ABSTRACT

A device for coffee preparation, the device comprising a head module and a base module. The head module comprising; a first end and a second end with a bore extending therebetween, an elongate element extending across the bore proximal the first end of the head module. The base module comprising; a first end and a second end and a bore extending from the first end at least proximal the second end. The head module mounted above the base module; and wherein the elongate element comprises at least one flat surface facing in the direction of the first end of the head module.

20 Claims, 7 Drawing Sheets

(58) Field of Classification Search
CPC .... A47J 31/0657; A47J 31/60; A47J 31/0668; A47J 31/06; B65D 11/1866; B65D 11/1873; B65D 21/0209; B65D 21/02; B65D 51/242; B65D 43/26; B65D 25/22; B65D 25/24; A23F 5/243; A23F 5/24
USPC .... 220/4.28, 4.26, 262, 23.88, 23.87, 23.86, 220/212.5, 212, 908, 544, 530, 529, 696, 220/772, 635, 628, 636
See application file for complete search history.

(56) References Cited

U.S. PATENT DOCUMENTS

| | | | | |
|---|---|---|---|---|
| 5,168,140 | A * | 12/1992 | Welker | A47J 36/027 219/689 |
| 5,402,908 | A * | 4/1995 | Warden | A47J 47/02 220/529 |
| 6,983,862 | B2 * | 1/2006 | Nottingham | B01F 15/00733 206/508 |
| 7,284,737 | B2 * | 10/2007 | Kane | A47G 23/0225 248/226.11 |
| 8,662,342 | B1 * | 3/2014 | DeTolla | B65D 81/245 215/231 |

OTHER PUBLICATIONS

International Search Report for PCT/AU2016/051003 dated Nov. 21, 2016, 4 pages.
Written Opinion of the ISA for PCT/AU2016/051003 dated Nov. 21, 2016, 4 pages.

* cited by examiner

KNOCK BOX

This application is the U.S. national phase of International Application No. PCT/AU2016/051003 filed Oct. 25, 2016 which designated the U.S. and claims priority to AU 2015904665 filed Nov. 12, 2015, the entire contents of each of which are hereby incorporated by reference.

TECHNICAL FIELD

The present disclosure relates to a receptacle for waste disposal. More particularly, the present disclosure relates to an improved modular knock box for disposal of coffee grounds or the like.

BACKGROUND

Disposal of waste in hospitality is essential for maintaining a sanitary work environment, particularly near to food preparation areas. Known waste disposal units are typically square or cylindrical buckets or bins adapted to receive food scraps and waste. However, these waste disposal units are typically not suitable for being used as a knock box for used coffee grounds.

In recent years, more and more cafes and restaurants have started to produce coffee products using commercial coffee machines which require the use of a group handle (sometimes referred to as a portafilter). Typically a group handle receptacle is filled with ground coffee beans and then is brought into a mating relationship with the coffee machine to extract the espresso, commonly referred to as a coffee shot, from the ground coffee beans. The group handle style coffee machines can be used to impart varying desired flavour, texture or consistency to a coffee shot based on a customer's preference or based on the type of bean used to make the coffee. This is a particular necessity for bespoke coffee shops which have become more prevalent.

However, there are a number of problems associated with current methods of compacting coffee within a portafilter as well as the risk of repetitive strain injuries forming with respect to repeated use of a portafilter, particularly with current compaction methods.

Problems may arise when producing espresso shots if the compaction of the ground coffee to form the "puck" is not sufficient. Forming a well compacted and substantially even tamping level of the puck allows for an even distribution of water by the shower of the espresso machine. Further, for a barista to make a puck which is sufficient to produce a desirable espresso shot relies on the barista feeling the shot compaction as they apply pressure which is heavily experience dependant and also relies on skill which new baristas may struggle to feel with present compaction methods. If the level of the puck is uneven or sloped, the water disbursed over the puck will pool in relatively lower areas which may cause undesirable flavours to be produced and even overflow from the portafilter which can cause undesirable bitterness of the espresso shot as well as have the potential for a barista to burn themselves from the water overflow.

Further, firm compaction of the puck is essential otherwise there is a potential for a "mushy puck" to form which lifts the puck from the portafilter and produces a weak or bitter espresso shot to be produced. Firm compaction of the puck allows for an even distribution of the water across and through the puck allowing the coffee oils to be desirable extracted which produces a more palatable espresso coffee shot. To form an even and compact puck, the barista must apply sufficient force through a coffee tamper to compact the ground coffee. The tamping area for a barista is commonly the same surface used for a countertop in a café or restaurant, and most common countertops or bench heights are around 900 mm or higher from floor level.

The relationship of the height of the tamping counter and the height of the barista varies greatly and it particularly important as tamping on a counter, which is relatively too high or too low introduces other potential repetitive strain risks. More particularly, the ulnar nerve follows a path from the spine through the shoulder, around the elbow, and along the wrist to the hand. If the counter is too high, then with a straight wrist at the tamper handle, the barista's elbow will be bent and elevated, sometimes shoulder-high. In extreme situations, the barista may have the elbow acutely bent, above the shoulder. These are at-risk postures as the ulnar nerve is also routed through an anatomically small passage at the elbow (the cubital tunnel), and an elbow that is bent far out of the neutral position (relatively unbent elbow) creates a sharp corner in the routing of the tendons and the ulnar nerve. Stress in the bent elbow can cause irritation, inflammation, and swelling, with possible compression and entrapment of the ulnar nerve. Also, the tamping force is passed on to the shoulder, which is rotated into an at-risk posture, and onward to the barista's back, which is likely also twisted to compensate for an unbalanced stance. The consequences can be serious in a relatively small period of time.

Further to the above, each barista working within a café or restaurant is not generally the same height, a tamping surface used for tamping coffee may cause repetitive strain injuries due to the relative height of the bench with respect to the barista. Statistically, as the average height of an average male is between around 177 cm and the average height of a female is around 164 cm, dependant on geographical location, having a bench height of 900 mm (typically standard for bench heights) forces a barista to bend their arm to apply pressure to compact the puck. As the barista bends their arm they apply only a fraction of their potential compaction force with respect to a relatively straightened arm and unskilled or training baristas will have difficulty in compacting the pack and maintaining an even puck level. Further, a barista bending their arm, which is often hundreds of times per day for bespoke coffee shops or cafes, are likely to develop a repetitive strain injury (RSI) from repeated compactions of coffee, and the rate and speed in which tamping needs to occur, due to bending their arm and applying a pressure exerted from in a direction perpendicular relative to their elbow. This strain injury is often referred to in the industry as "barista elbow".

In addition to the above, used coffee grounds are typically required to be disposed into a receptacle which is exclusively for coffee grounds. This is due to the fact that the group handle is required to be reused without being washed between each coffee shot produced. Therefore, a regular waste receptacle, such as a bin, is not suitable for coffee grounds to be disposed in directly from a group handle, as the barista must 'knock' the group handle on the disposal unit to loosen and remove the used coffee grounds in the portafilter. As such, a knock box (also referred to as a "knockbox", "bash bin" or "coffee column") can found in nearly all cafes, restaurants or any other location where coffee is consumed. Knock boxes generally comprise a receptacle and a cylindrical bar which the group handle can be knocked or impact to remove the coffee grounds from the portafilter. The knocking bar of the knock boxes are traditionally cylindrical as this allows coffee to easy fall from the bar and into the receptacle.

Any discussion of the prior art throughout the specification should in no way be considered as an admission that such prior art is widely known or forms part of common general knowledge in the field.

SUMMARY

Problems to be Solved

It may be advantageous to reduce the potential for repetitive strain injuries (RSI) for forming a coffee puck.

It may be further advantageous to have a compaction surface which is adjustable for a user to compact coffee.

It may be advantageous to reduce mess on food or drink preparation areas and countertops.

It may be advantageous to reduce the potential of overflow of water and/or when making espresso.

It may be advantageous to provide a device which allows disposal of waste which minimises the effort required to be exerted by a user when emptying a waste receptacle.

It may be an advantage to reduce the physical exertion of a person preparing coffee.

It may be advantageous to provide a more efficient means for preparing coffee.

It may be an advantage to provide a modular waste disposal device.

It is an object of the present invention to overcome or ameliorate at least one of the disadvantages of the prior art, or to provide a useful alternative.

Means for Solving the Problem

A first aspect of the present disclosure may relate to a device adapted for coffee preparation. The device preferably comprises a head module and a base module. The head module may comprise a first end and a second end and a bore extending therebetween and an elongate element extending across the bore proximal the first end of the head module. The base module may comprise a first end and a second end and a bore extending from the first end at least proximal the second end. The head module may be mounted above the base module; and wherein the elongate element comprises at least one flat surface facing in the direction of the first end of the head module.

Preferably, at least one extension module may comprise a first end and a second end defining a bore therebetween and is mounted between the head module and the base module. Preferably, a shaft module may comprise a first end and a second end defining a bore therebetween and is mounted between the head module and the base module. Preferably, the elongate element further may comprise a predetermined structure adapted to receive a group handle. Preferably, the base module may further comprise a stabilising means. Preferably, the base module further may comprise a partition. Preferably, the partition may be movable relative to the base module. Preferably, the bore may define an opening at the second end of the base module, in which the partition may be adapted extend across the opening. Preferably, the partition forms a sealing relationship across the bore between the first end and the second end of the base module. Preferably, the head module may comprise a flared rim. Preferably, the elongate element is formed integrally with the head module. Preferably, each module may comprise a mounting means. Preferably, a user of the device may tamp a portafilter on the flat surface of the elongate element. Preferably, the head module further may comprise a support means.

Another aspect of the present disclosure may relate to a device adapted for coffee preparation. The device may comprise a head portion comprising a first end and a second end and a bore extending therebetween and an elongate element extending across the bore at the first end of the head module. The elongate element may be disposed less than or equal to 900 mm relative to floor level; and wherein the elongate element comprises a flat surface.

Preferably, the height of the elongate element relative to the floor may be adjustable between the range of 600 mm to 900 mm. Preferably, the device may be installed in at least one of the group of; a bench, a countertop and a table. Preferably, the elongate element may be adapted to allow a user of the device to tamp coffee on the flat surface.

In the context of the present invention, the words "comprise", "comprising" and the like are to be construed in their inclusive, as opposed to their exclusive, sense, that is in the sense of "including, but not limited to".

The present disclosure is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present disclosure.

DESCRIPTION

Figure 1:
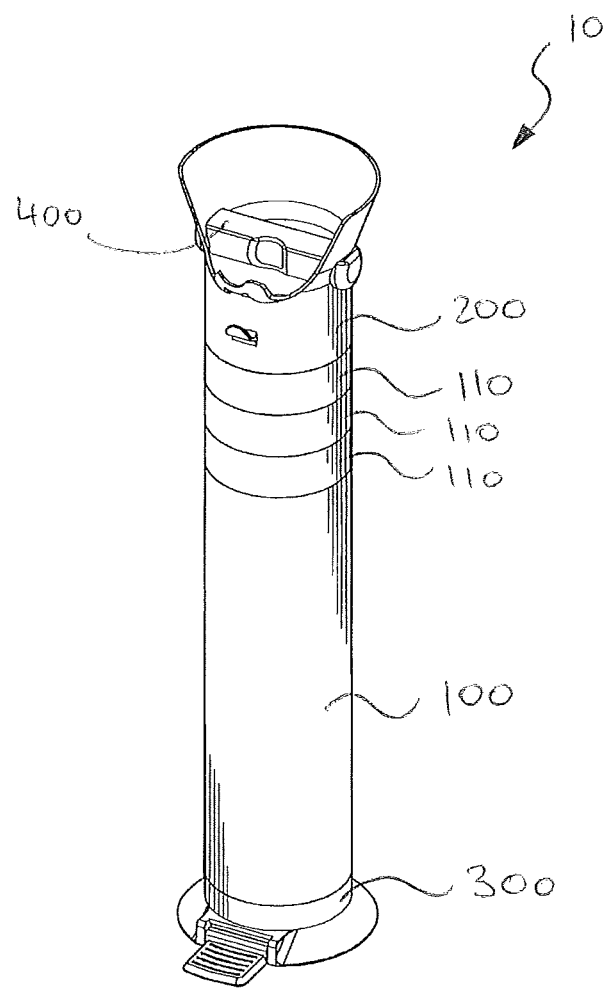
FIG. 1 illustrates a perspective view of an embodiment of the knock box of the present disclosure with a plurality of extension modules.

Preferred embodiments of the present disclosure will now be described with reference to the accompanying drawings and non-limiting examples.

The present disclosure is directed to a coffee ground disposal and preparation device 10 and a method of use thereof. More particularly, the device 10 is preferably a modular device 10 and may allow for coffee tamping in a group handle or portafilter on an elongate element or knock bar 400. At least one of the knock bar 400 or the modular device 10 may be adjustable relative to the barista such that barista can arrange the device 10 for their relative height to allow tamping on the knock bar 400 with a relatively straight arm. Tamping on the knock bar 400 with a relatively straight arm may reduce the potential for a strain injury to form.

Tamping is the process of compacting ground coffee in a portafilter. The compacted ground coffee in the portafilter is referred to in the industry as a "puck". The puck is preferably formed with a level upper surface, which is the surface the tamping force is applied to, and of be of a sufficient compaction to allow a desirable shot to be produced. A desirable single shot typically is made with between 6 to 8 grams of coffee ground exposed to around 7 bar to 9 bar (approximately 700 kPa to 900 kPa) with a volume of espresso between 28 ml to 36 ml, with the shot typically taking around 25 to 30 seconds to pour. If the espresso shot final volume is outside of the desirable ranges, the puck has been compacted too much or too little, and has resulted in a typically undesirable shot. Therefore, if the coffee shot is outside of these limits, the coffee is usually rejected and thrown away which results in a commercial loss.

Most group handles generally comprise a portafilter, a filter holder cup which retains the portafilter, a filter holder handle attached to the filter holder cup mid a spout disposed on the bottom of the holder cup, which directs the extracted espresso into a desired cup or receptacle. The spout is generally disposed in the centre of the holder cup which allows for a more even extraction of the espresso shot from the coffee and having a spout off centre may over-extract a portion of the ground coffee in the portafilter resulting in an undesirable espresso shot flavour. While some spouts distribute espresso off-centre relative to the filter holder cup, these spouts have a fluid conduit which protrudes from the base which results in an undulating bottom surface of the filter holder cup. It will be appreciated that at least a portion of the bottom surface of the filter holder is substantially flat such that the ground coffee can be tamped in the portafilter An undulating bottom surface of the filter holder prevents the group handle from being positioned completely on a bench to allow for tamping. As such, only a portion of the rim of the group handle is adapted to rest on the edge of a bench to allow tamping of the puck. Such an arrangement requires the group handle 2 to have an upward force applied by the user to resist the downwards tamping force. This may further add to the potential for repetitive strain injuries to form, such as a common coffee preparation injury called "barista elbow".

Typically, cafes and restaurants use a knock box to dispose of spent or used coffee grounds. The knock box is generally a receptacle which is exclusively used for coffee ground waste disposal, as this allows the group handle and the portafilter to remain relatively clean as other general café wastes may cause contamination of the group handle, and therefore the coffee being produced. The knock box is typically emptied later during the day into a general waste receptacle and cleaned for use again.

Presently, to empty the spent coffee grounds knock box a user is required to manually lift the knock box and upend the knock box to empty the waste. This is generally a strength induced task and requires the user emptying the knock box to shake or hit the device in an attempt to remove all of the coffee grounds. This is particularly difficult as the first coffee grounds disposed therein during the day have an opportunity to dry out and harden within the knock box and often is consolidated enough to require agitation to be removed. Further, upending the knock box generally requires the user emptying the knock box to come into contact with the newest coffee grounds in the knock box which can be unhygienic. Further, there is a risk of potential injury of the user up upending the knock box. Preferably, the modular device of the present disclosure provides for a relatively less strenuous device to empty as the device requires considerable strength to lift and overturn.

More particularly, the knock box device 10 of the present disclosure may have a trap door or other assembly which allows a user to remove a slide or partition located near to, or at, the base module 300 of the device 10 such that the coffee grounds can be expelled therefrom. This may remove the requirement of for a user emptying the device 10 to upend the device 10 to remove the coffee grounds. Preferably, the base module 300 of the device 10 is adapted to be positioned above and/or rest on the rim of a conventional café or restaurant waste receptacle, such that the partition only need be removed to remove the coffee grounds. Typically, the weight of the spent coffee grounds in a relatively full knock box device 10 is of a sufficient overall weight to loosen the driest coffee grounds at the bottom of the knock box to allow the coffee grounds to be deposited in the waste receptacle. This therefore reduces the energy required to empty the device 10 and may reduce the potential for an injury to occur.

Preferably, the device 10 is formed from a plurality of modules. The modules may comprise at least a head module and a base module, and may further comprise a shaft module 100 and/or at least one extension module 110. Optionally, each of the modules is preferably adapted to be attached or mounted on another respective module. Alternatively, each module may have a predetermined mounting means configuration which prevents predetermined modules from being mounted to other predetermined modules. For example, the extension modules 110 may have a mounting means which does not allow them to be mounted directly to the base module 300 and requires a shaft module 100 to be positioned therebetween. It will be appreciated the device 10 need only comprise one head module 200 and one base module 300.

Preferably, the head module comprises; a first end and a second end and a bore extending therebetween and an elongate element extending across the bore proximal the first end of the head module 200. It will be appreciated that the elongate element may be positioned in the bore of the device 10 at any predetermined position, which may also include near to the second end of the head module 200. Preferably, the base module 300 comprises a first end and a second end, and a bore extending from the first end at least proximal the second end. It will be appreciated that the bore of the base module 300 may not extend through second end of the base module 300, and may only extend at least from the first end and terminate intermediate the first end and second end of the base module 300. The head module 200 may be adapted to be mounted above the base module 300.

The device 10 may comprise a shaft module 100 and optionally, at least one extension module 110 is provided such that a user can manipulate the relative height of the device 10. The extension module 110 may allow a user to adapt the device 10 in relation to their anatomical height or with respect to the surface the device is positioned on. Further, the device 10 is adapted to be able to receive a compression force applied by a user of up to and at least 20 lbs without the device 10 collapsing.

In a broad aspect, the device 10 comprises a head module 200 and a base module 300. The head module 200 is preferably adapted to receive an elongate element 400 which extends across the cross sectional space bound by the perimeter walls, and more preferably, the elongate element 400 is adapted to substantially bisect the cross section of the head module 200. Preferably, the elongate element 400 is adapted to be a knock bar or bash bar. At least the head module 200 and the base module 300, when in a predetermined mounted relationship define a receptacle or cavity in which coffee grounds can be disposed. It will be appreciated that the cavity is extended with the addition of a shaft module 100 or an extension module 110.

In at least one embodiment, each of the shaft module 100 and the extension modules 110 comprise a side wall and a hollow cross section. The shaft module 100 and the extension modules 110 are preferably used to alter the height and/or volume of the device 10. Further, the head module and the base module may also have hollow cross sections such that materials can be deposited therein, such as coffee grounds. It will be appreciated that a trap door or partition 320 is disposed in at least one module, such that materials deposited in the device 10 does not undesirable fall through the device onto the floor. Preferably, the trap door or partition 320 is disposed in the base module 300. A slot or aperture may be formed in the side wall of a module to receive the partition 320.

When the modules are mounted relative to each other, the modules form the device 10. Preferably, at least one of the shaft module 100, an extension module 110 and the head module 200 are adapted to be mounted on the base module 300. The head module 200 and the base module 300 are preferably formed with corresponding mating means or mounting means 205, 305. Throughout this specification the terms 'mating means' and mounting means' are used interchangeably. In one example, the mating means may be a tongue 205 and groove 305, in which the tongue 205 of the head module 200 is received in the groove 305 of the base module 300. It will be understood that the tongue and groove locations may be reversed, such that the tongue is disposed on the base module 300 and the groove is disposed on the head module 200. It will also be appreciated that any suitable mounting means may be used, for example a push fit arrangement, a friction fit arrangement, a screw and thread arrangement or press fit mounting means. Each of the shaft 100 and extension modules 110 may also comprise a similar mounting means. Optionally, a detent may be provided to releasably secure the modules relative to one another. It will be appreciated that the modules may be secured by any suitable means.

In yet a further embodiment, each of the modules 100, 110, 200, 300 preferably comprises a substantially uniform cross section, at least near to the mounting means, such that the modules can be mounted to each other in any desired order. For example, when a plurality of modules are mounted, the respective outer wall of the modules of the device 10 are substantially linear, or flush, relative to an adjoining module. However, at illustrated in the Figures, the head module may comprise a flared or annular projection, and the base module may comprise a flared or other predetermined base perimeter 310. The base perimeter 310 may be adapted to provide stability to the device 10.

The head module 200 is preferably adapted to receive an elongate element 400. In at least one embodiment, the elongate element 400 is a knock bar with at least one relatively flat surface. The flat surface of the elongate element 400 may allow for a user to rest a portafilter or group handle thereon and allow the user to tamp coffee. Adapting the knock bar 400 of a knock box 10 for tamping may provide a number of ergonomic and industry specific advantages to for the user. Most notably, as current tamping methods generally require a barista to tamp on the bench, which is also used for serving food, the potential mess on service space is reduced. Further, if the device 10 is adapted to be adjustable, the user of the device 10 can alter the height of the device to allow tamping with a relatively straight arm.

Tamping with a straight arm will generally reduce the potential for a user developing a repetitive strain injury and also allow the user to more easily exert pressure when tamping to apply a sufficient amount of force to produce a puck which is desirably compact. Further, tamping with a straight arm generally allows a user to 'feel' the pressure exerted onto the ground coffee to form the puck, such that the user does not over-compact or under-compact the puck, which can result in an undesirable espresso shot being produced.

Optionally, the elongate element 400 further comprises a docking means, which is adapted to receive a portion of a portafilter 2. More particularly, the dock may be shaped to receive the spout of the portafilter 2 such that a larger surface area of the bottom the group handle head can be positioned on the flat surface 410 of the elongate element 400. This allows for an improved tamping surface which allows more even distribution of pressure to form the coffee puck.

In an embodiment (not shown), applying pressure to the stabilising means 350, preferably in the form of pedal 350, may rotate the elongate element 400 from a first position to a second position. The first position may be an at rest position in which a non-tamping surface of the elongate element 400 faces relatively upwardly relative to the axial direction of the device 10, and the second position rotates the elongate element 400 such that a user can tamp on the flat surface of the elongate element 400. Alternatively, the elongate element may be adapted to be manually rotated such that a non-tamping surface faces in the axial direction such that a user can knock used coffee grounds out of the portafilter without damaging the flat surface 410 of the elongate element. It will be appreciated that the elongate element may comprise a plurality of flat surfaces 410 such that a user may tamp on a predetermined flat surface 410.

FIG. 1 illustrates an embodiment of a knock box device 10. The device 10 comprises a shaft module 100 and a plurality of extension modules 110. A head module 200 is adapted to be mounted relatively above the base module 300, and when present, mounted relatively above at least one extension module 110 and/or the shaft module 100. The base module 300 of the device 10 preferably comprises a stabilising means 350, such as a pedal, which is adapted to have a force applied thereto to provide stability. The stabilising means 350 may be used when the elongate element 400 is being used for tamping to reduce the potential for the device tilting or moving undesirably.

Figure 2:
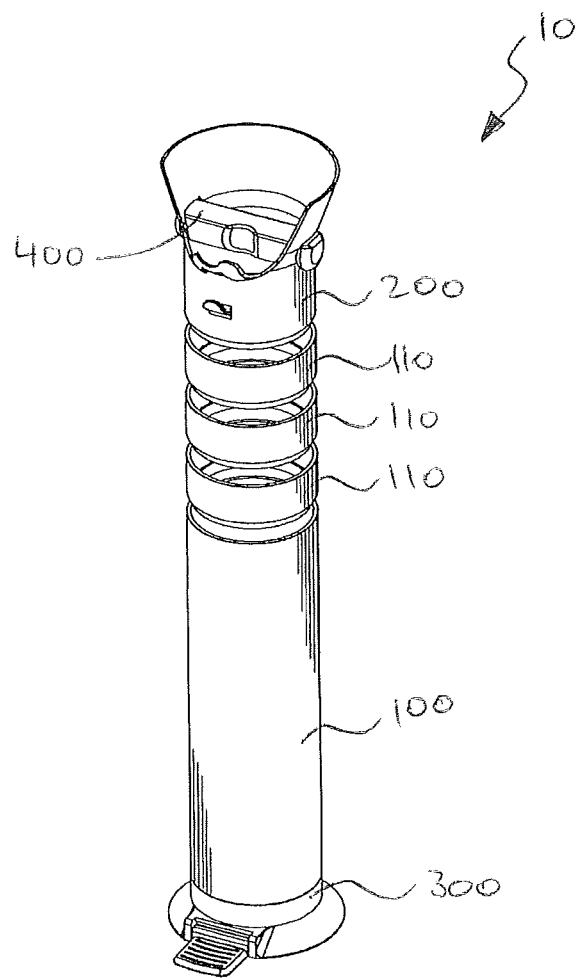
FIG. 2 illustrates a perspective view of a partial exploded view of the embodiment of FIG. 1.

As shown in FIGS. 1 and 2, at least a portion of the lower perimeter 310 of the base module 300 is preferably bevelled or flared. This may provide additional stability to the device 10 when in use. Preferably, a pair of flanges 315 is disposed near to the lower perimeter 310. Each of the flanges 315 may comprise at least one aperture 316 adapted to receive an attachment means of the stabilising means 350 therein, such that the stabilising means is releasably retained. Optionally, the stabilising means 350 is movable or rotatable relative to the wall 301 of the base module 300, such that it can move between at least an in use position and a storage position. The in use position being adapted for receiving a load and the storage position, in which the stabilising means 350 is orientated in the axial direction relative to the base module 300.

FIG. 2, illustrates an exploded view of the embodiment of FIG. 1. The extension modules 110 of the device 10 are adapted to be removably installed and uninstalled on the device 10, such that the extension modules 110 allow a user to adjust the relative height of the device 10. This may allow the user to modify the device 10 for a more correct anatomical fit for the user when in use. Preferably, each of the extension modules 110 comprises a side wall 111 with a perimeter which substantially conforms to the relative side wall shape of the shaft 100 and/or the head module 200. The side wall 111 of the extension module 110 may comprise a retaining means 115 adapted to releasably retain the extension module 110 in a desired position relative to the head module 200. The retaining means 115 may be in the form of a tongue which is adapted to be received in a corresponding groove of at least one of; another extension module the shaft 10, the base module 300 or the head module 200. This allows each extension module 110 to be stacked or mounted on the shaft module 100 or on the base module 300.

Figure 3:
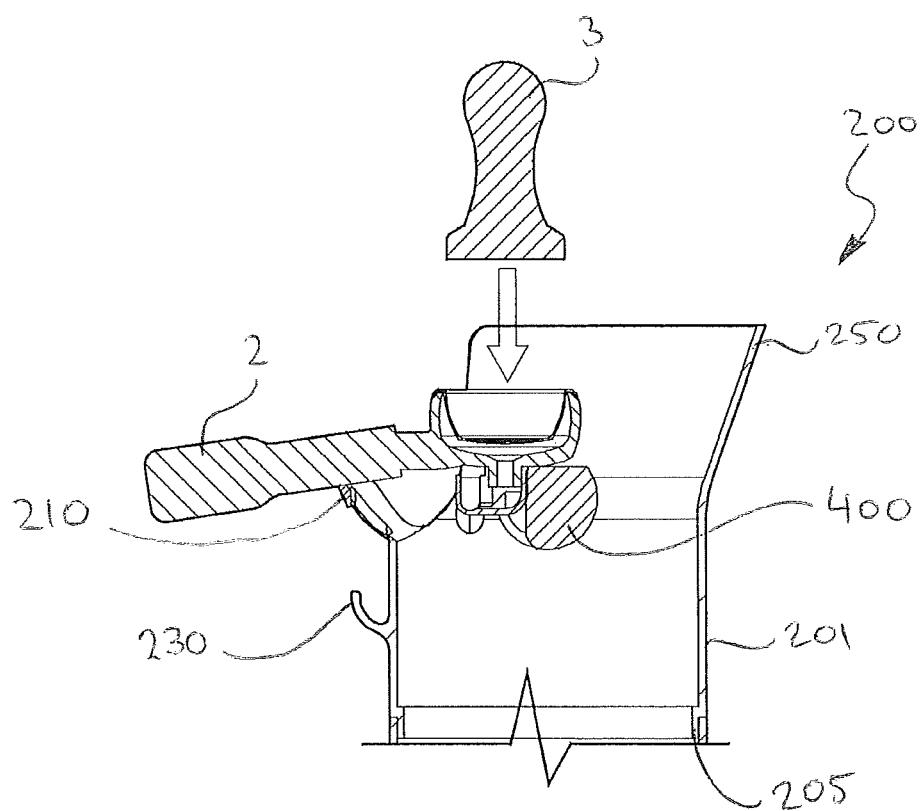
FIG. 3 illustrates a sectional view of a group handle positioned on an embodiment of the tamping bar installed in a knock box.

FIG. 3 depicts a further embodiment of the head module 200 of the device 10 in which the elongate element 400 is adapted to allow tamping thereon. A group handle 2 head is positioned on a flat surface 410 of the elongate element 400 and the handle of the group handle 2 is positioned on a support means 210. Positioning the group handle on the support means 210 and the flat surface 410 of the elongate element 400, preferably allows the group handle to be retained thereon such that a barista can have a shot prepared for the next customer or free their hands for another task. A protrusion 230 extends from the side wall 201 of the head module 200. The protrusion 230 may be adapted to receive a towel or cloth, or have other items hung therefrom. This allows the device to be used for a multitude of purposes in a café and may reduce the space requirements for small cafés. Preferably, the head module 200 comprises a flared upper rim 250 which at least partially extends around the perimeter of the head module 200. The flared upper rim 250 may assist with directing used coffee grounds into the cavity of the device 10 when a group handle 2 is knocked on the elongate element 400. However, upper rim 250 may be formed with any other predetermined shape.

Figure 4:
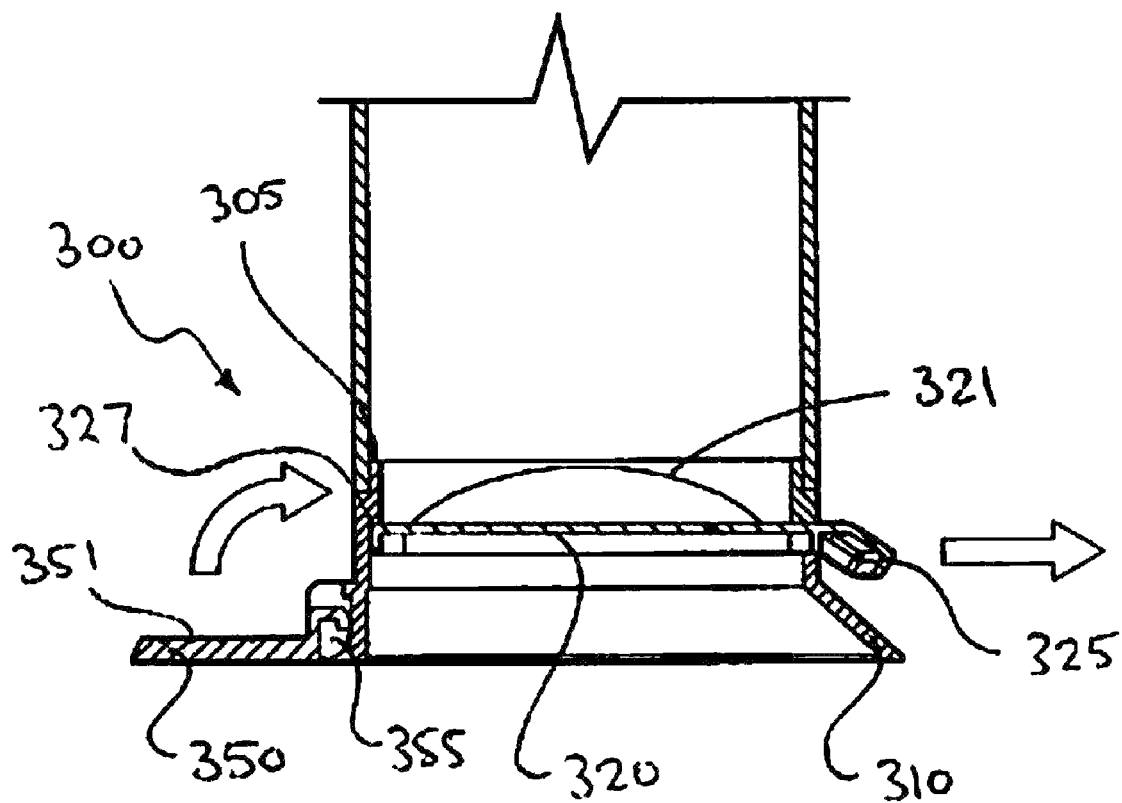
FIG. 4 depicts an embodiment of a trap door for waste removal.

An embodiment of the base module 300 of the device 10 is depicted in FIG. 4. The base module 300 is shown with a shaft module 100 mounted thereon. Preferably, the base module 300 comprises a flared or bevelled lower perimeter 310 adapted to be positioned on a flat surface, such as a floor or a bench. The flared lower perimeter 310 may provide improved stability to the device 10, particularly when tamping on the elongate element 400. However, it will be appreciated that the base module may be formed without the bevelled lower perimeter and instead comprise a continuous or flush outer perimeter, this may be more suitable for a countertop device, for example.

The base module may be formed or provided with a non-slip base coating or from a material with is non-slip, such as silicone or rubber, or may comprise feet or stoppers which resist sliding on a surface. Providing a base with a non-slip surface allows additional stability when tamping. It a further unillustrated embodiment, the device 10 comprises a plurality of feet which allows the base module 300 to be elevated from a floor surface.

As shown, stabilising means 350, shown in the form of a pedal 351, is disposed near to the base of the base module 300. The pedal 350 may be adapted to be movable relative to the side wall 305 of the base module 300, such that the pedal 350 can be moved between an in use position and a storage position. A pair of flanges 315 may be disposed on, or near to, the lower perimeter adapted to receive the pedal 350. The pair of flanges 315 may comprise apertures (not shown) or suitable retaining means adapted to retain the pedal 350 in a position relative to the base module 300, such that a hinge 355 is formed. Alternatively, the stabilising means 350 may be fixed in position, or removably attached to the device 10.

A trap door or partition 320 is preferably disposed near to the lower perimeter 310 of the base module 300. The partition 320 is shaped to generally correspond to cross sectional area of the base module 300 such that when the partition 320 is in a sealing position, coffee grounds or other materials disposed in the cavity of the device 10 are retained in the cavity. The partition 320 comprises a handle portion or manipulation means 325 which allows a user to move the partition from the sealing position to an open or partially open position. When the partition is not in a sealing position, the device 10 may allow coffee grounds therein to pass from the cavity through the base module opening 360.

The partition 320 may further comprise a biasing means 321 which biases the partition 320 in the sealed position, such that coffee grounds may be prevented from undesirably falling through the base module opening 360. The partition 320 may also comprise an abutting member 327 which abuts an inner side of the side wall of the base module 300. The abutting edge may also be mounted on or comprise a sealing lip (not shown), which provides a superior seal to prevent coffee grounds from being unwantedly expelled from the device 10. A rail, track or lip (not shown) may retain the partition 320 in the sealed position or facilitate return to the sealed position.

In an unillustrated embodiment, the base module 300 comprises a cavity funnel which directs the coffee grounds in the cavity to a base module opening 360 which is relatively smaller than the inner cross section of the device 10. This may allow for a more focused removal of ground coffee when the partition is moved from the sealed position. It will be appreciated that not all coffee grounds may be retained when the partition 320 is in the sealed position, but a majority will be retained in the cavity of the device 10.

Figure 5:
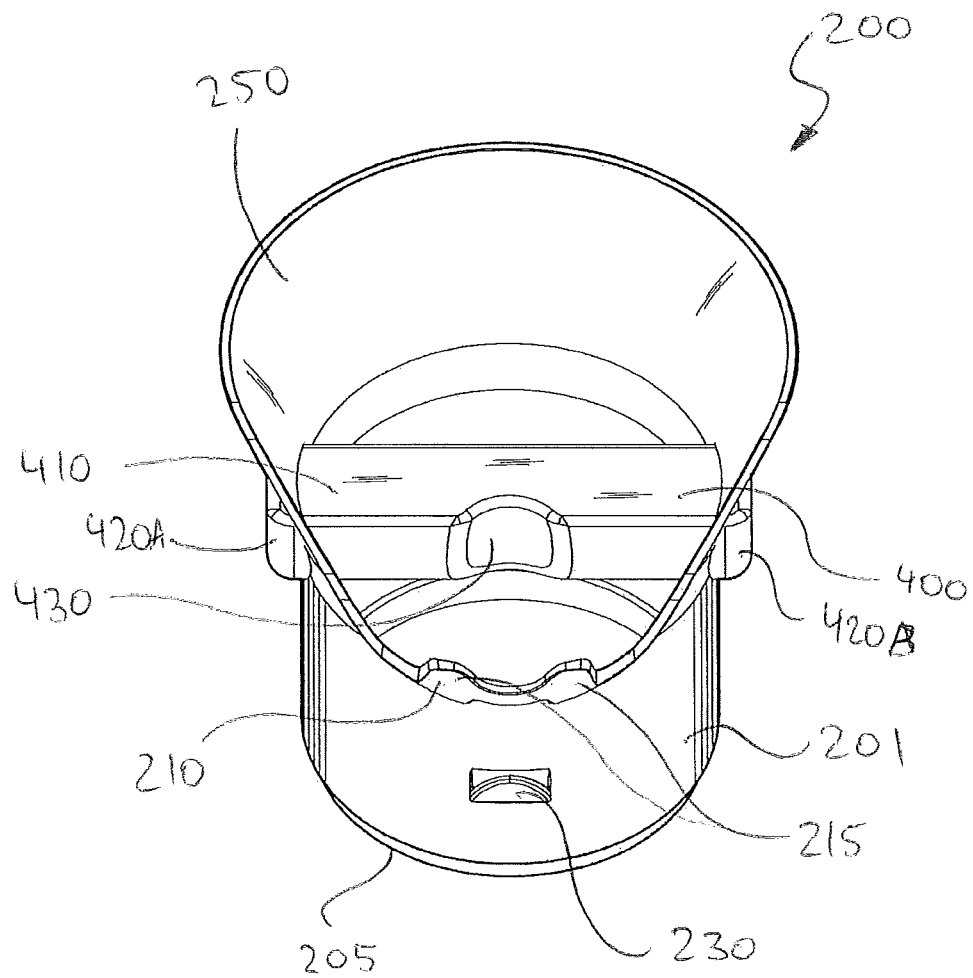
FIG. 5 illustrates a perspective front view of a knock bar head module with an elongate member which has a flat tamping surface.

Turning now to FIG. 5, there is depicted a top perspective view of an embodiment of the head module 200. The head module 200 preferably comprises a pair of apertures (not shown) adapted to receive a respective end 420A 420B of the elongate element 400 therein. The head module 200 may also comprise a support means 210 which may support the handle of the group handle 2 when the head of the group handle is resting on the elongate element. The support means 210 shown is attached to the head module 200 at its distal end and comprises a prong formation 215 at its proximal end, which may support the handle of the group handle when positioned therebetween.

Optionally, the ends 420A, 420B of the elongate element may be biased ends, which comprise at least one elastically deformable element (not shown). The deformable element may be adapted to deform under a compression force, such that when the compression force is released, the deformable element returns to substantially the original shape. This may allow the elongate element 400 to be secured to the head module 200 of the device 10 in the apertures (not shown).

In an alternate embodiment (not shown), the ends 420A, 420B comprise attachment means adapted to receive a cap or abutting element. The attachment means may be a screw or a press fit means, such that the cap can be mounted thereon. Alternatively, the each cap may be a handle which allows the device 10 to be lifted. The cap or handles may have a larger cross sectional area or different shape relative to the elongate element 400. Preferably, when the cap or handles are mounted on the elongate element 400, the mating relationship between the cap and the elongate element 400 clamps or secures the elongate element 400 to the head module 200.

Any predetermined cross-sectional shape may be selected for the elongate element 400, but the cross sectional shape preferably comprises at least one flat surface 410. Examples of shapes may be rectangular, substantially semi-circular, triangular or any other predetermined regular shape. A diameter may be around 3 to 6 cm or may comprise a cross sectional area of typically between 0.0009 m² to 00036 m². The flat surface may have a width of between 15 mm to 60 mm, and more preferably between 20 mm to 30 mm. The cross-section of the elongate element 400 may also be varied for different shaped group handles 2. Optionally, a predetermined structure 430 (FIG. 5) may be formed in the elongate element 400, such as a protrusion, an aperture or any other predetermined shape which is not uniform with the general cross-section of the elongate element 400. A textured surface (not shown) or slip resistant material may also be provided on the flat surface 410 of the elongate element 400. In alternate embodiment, the elongate element 400 is adapted to abut an inner wall of the bore of the device 10, and therefore a module of the device 10 does not require an aperture or the like to retain the elongate element 400. If the elongate element 400 is adapted to abut the wall or walls of the bore, the elongate element 400 is provided with an abutment means (not shown) which conforms to the shape or contours of the wall/walls of the bore, and the abutment means may further comprise stoppers or non-slip abutment means. Further, the bore of the device 10 may be contoured or formed to allow the elongate element 400 to abut the bore wall, or walls.

In yet a further embodiment, the elongate element comprises a slot (not shown) which receives a portion of the side wall 205 of the head module 200 when the elongate element is received in the apertures. When the slot receives a portion of the side wall 205 the elongate element is releasably secured to the head module 200, such that upending the device 10 may not cause the elongate element 400 to come free. Alternatively, the head module may be formed with the elongate element.

Figure 6:
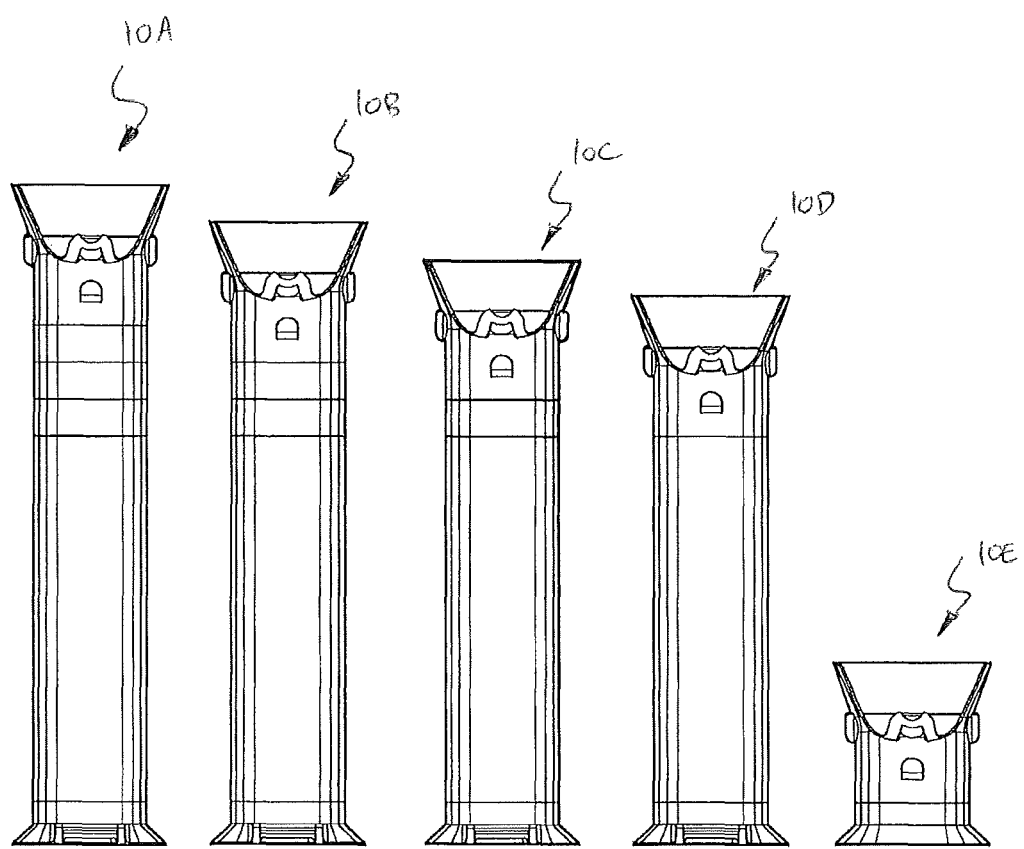
FIG. 6 illustrates another embodiment of a knock box with a plurality of removable sections.

FIG. 6 illustrates a plurality of embodiments of the device 10, in which the relative height of the device 10 is adjustable. Device 10A depicts an embodiment which comprises a shaft module 100 and three extension modules which are releasably retained relative to each other. Device 10B illustrates the device of 10A in which one of the extension modules 110 have been removed. Device 10C also shows the device of 10A in which two of the extension modules 110 have been removed. It will be appreciated, that the device 10D does not need to comprise any extension modules 110, and only the shaft module 100 is disposed between the head module 200 and the base module 300. It will be further appreciated that the device 10E need only comprise a head module 200 and a base module 300.

Figure 7:
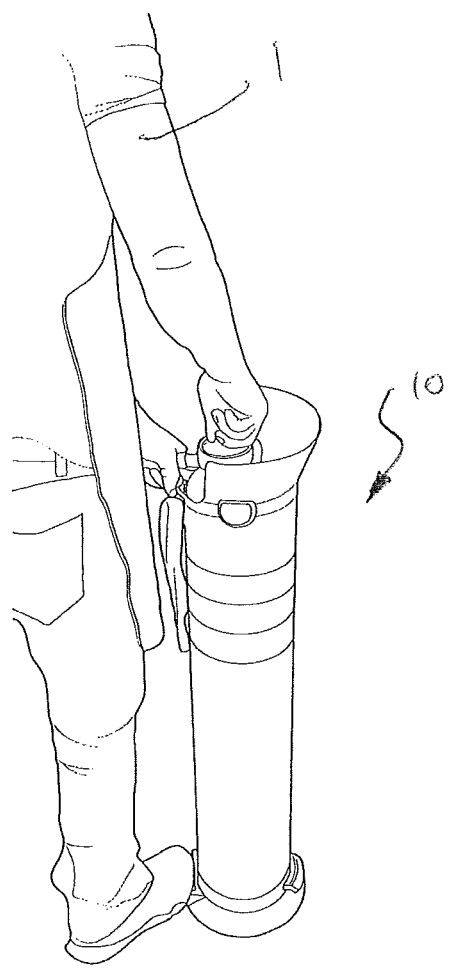
FIG. 7 illustrates a further embodiment of the knock box in which a user is tamping on the knock bar.

A user 1 using the device 10 is illustrated in FIG. 7, in which the user can maintain a relatively straight arm whilst using the device 10 to tamp coffee in a group handle. The user 1 may apply pressure to the base of the device 10, preferably on the stabilising means 350, to reduce the potential for the device 10 to move while in use. Further, while the group handle may be rested on the support means 210, the user may also grip the handle in a preferred position to tamp the coffee. However, it will be appreciated that placing the group handle on the support means 210 and resting the group handle on the elongate element 400, referred to as the desired location, may allow for a more even tamping to form a puck with an even level. Resting the group handle in the desired location may allow relatively inexperienced users to produce a more consistent puck which may result in a more desirable espresso shot to be produced.

While not illustrated, in at least one embodiment there is provided a group handle receptacle or protrusion adapted to recept the group handle or portafilter. This allows the portafilter to be rested or removably attached to the device. Preferably, a group handle protrusion is formed to releasably retain the group handle, such as a C-clip, and is adapted to retain a neck portion, or handle portion, of the group handle. This allows the device to be upended or tilted without the group handle unwantedly coming free from the device.

Preferably the device 10 allows for tamping of coffee on the bash bar or knock bar. Preferably, the elongate element 400 is adapted to be the bash bar or knock bar while also allowing tamping of the group handle thereon. This provides a significant advantage as this typically allows less mess to be produced when making coffee as typical methods require the group handle to be tamped directly on a bench surface. In at least one embodiment, tamping on the elongate element 400 of device 10 allows the user to tamp with an extended arm. This provides a number of ergonomic benefits as well as reduces the potential for repetitive strain injuries to form in the user when tamping.

Preferably, the device 10 has the elongate element 400 positioned at less than 900 mm from the relative surface of the floor in which the user is standing. The device typically allows the user to position the elongate element 400 at a level in which the user can tamp on the elongate element 400 at a height which allows their tamping arm to be relatively straight. This allows the user to apply sufficient force to adequately tamp the ground coffee to form the puck. A user tamping with a straight arm may also feel the compaction of the ground coffee more easily and expedite training of a barista.

In addition, typically in a café as the day continues, a coffee grinder generally produces progressively finer coffee grinds. This is due to the fact that coffee grinds may be ground a number of times which makes the coffee expelled from the coffee grinder relatively finer. This results in more oils being released into an espresso shot and not enough sugar, which may result in the coffee shot tasting undesirable. Tamping with a full arm extended allows a user of the device to earlier detect the variance in the coarseness of the coffee grind and adjust tamping methods and/or fineness of grinding of the coffee grinder to a preferable medium grind. This allows the production of more consistent desirable tasting coffee which allows a balance between coffee sugars and oils to be extracted.

In yet another unillustrated embodiment, the device may comprise at least one handle or aperture, which allows a user to move the device by gripping the handles or handle. This may be particularly useful when lifting the device for emptying. Further, the handles or apertures may be anatomically shaped to more comfortable place fingers while lifting, as a full device 10 may weigh in excess of 10 kg.

The modules of the device 10 may be formed from a polymer, a composite material, a ceramic, wood, a metal, a metal alloy, any other suitable material or a combination thereof. Further, the axial cross-section of the modules may be any predetermined shape, such as a circle, oval, rectangle, triangle or any other desired shape.

Optionally, the elongate element 400 is formed from a polymer, wood, rubber, metal, any other suitable impact resistant material, or a combination thereof. The term "impact resistant" will be understood to mean a material that may receive blunt forces and remain relatively undeformed or be elastic in nature such that the elongate element substantially returns to a predetermined shape.

In yet another unillustrated embodiment, the device may be a head module 200 which is received in a bench or counter. If the head module 200 is received in a counter, the elongate element 400 of the head module 200 is adapted to be lower than 900 mm from the floor level such that a user may tamp on the elongate element 400 with a relatively straightened arm.

In yet another embodiment, the support means 210 is adjustable relative to the side wall 201 of the head module 200. The support means may be removably attached to the head module 200, or any other predetermined module. A tamp support means (not shown) may be formed on the head module 200, or may be disposed on the support means 210. The tamp support means be adapted to allow a tamper 3 to be held by the device 10 such that the tamper 3 is less likely to be exposed to water or moisture. If a tamper 3 is exposed to moisture, tamping coffee becomes more difficult as moisture may lift coffee grounds from the puck after tamping. The support means 210 may be any means which allows support of an article, and may vary in height and size, but is preferably adapted to support at least a portion of a group handle 2 or a tamper. The head module 200 may also comprise a port or dock adapted to receive the support means 210 and/or the tamp support.

Preferably, at least one of the support means and the tamp support are relatively adjustable and/or removable from the head module 200. Optionally, an intermediate support (not shown) may be disposed between the modules, which may allow retainment of articles, such as a tamper, a group handle or any other common café articles. The device 10 may comprise a plurality of intermediate supports adapted to be rotatable relative to the axial direction of the device 10. The tamp support may be, for example, a protrusion member (not shown) with an aperture or teeth arrangement adapted to receive the tamper therein. Alternatively, the tamp support may comprise a depression or pouch to receive small common café articles, such as a tamper 3.

In yet a further embodiment, the elongate element may be disposed in the bore of the head module 200 at any location between the first end and the second end. Optionally the head module 200 may be formed with a contoured first end perimeter. The contoured perimeter preferably comprises a cleft which may be adapted to receive a portion of the handle of a group handle 2. The cleft may comprise flexible lips such that when a group handle or other article is received therein, the lips form an abutting relationship with the group handle 2. Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

The invention claimed is:

1. A device adapted for coffee preparation, the device comprising:
   a head module and a base module;
   the head module comprising:
      a first end and a second end and a bore extending therebetween;
      an elongate element extending across the bore proximal the first end of the head module;
   the base module comprising:
      a first end and a second end and a bore extending from the first end at least proximal the second end;
   the head module is mounted above the base module; and
   wherein the elongate element comprises at least one flat surface facing in the direction of the first end of the head module.

2. The device as claimed in claim 1, further comprising at least one extension module having a first end and a second end defining a bore therebetween and being mounted between the head module and the base module.

3. The device as claimed in claim 1, further comprising a shaft module having a first end and a second end defining a bore therebetween and being mounted between the head module and the base module.

4. The device as claimed in claim 1, wherein the elongate element further comprises a predetermined structure adapted to support a group handle from below, such that the group handle may rest via gravity on top of the predetermined structure.

5. The device as claimed in claim 4, wherein the predetermined structure includes a recess formed on a side wall of the elongate element, wherein a top surface of the elongate element is adapted to support a bottom surface of the group handle and a vertical wall of the recess is adapted to stabilize a lateral side surface of the group handle.

6. The device as claimed in claim 1, wherein the base module further comprises a stabilizer.

7. The device as claimed in claim 1, wherein the base module further comprises a partition.

8. The device as claimed in claim 7, wherein the partition is movable relative to the base module.

9. The device as claimed in claim 8, wherein the base module bore defines an opening at the second end of the base module, in which the partition is adapted extend across the opening.

10. The device as claimed in claim 9, wherein the partition forms a sealing relationship across the bore between the first end and the second end of the base module.

11. The device as claimed in claim 1, wherein the head module comprises a flared rim extending to a height above the elongate element.

12. The device as claimed in claim 10, wherein the flared rim includes a cut out to allow substantially level access with the elongate element.

13. The device as claimed in claim 1, wherein the elongate element is formed integrally with the head module.

14. The device as claimed in claim 1, wherein each module comprises a mount.

15. The device as claimed in claim 1, wherein the flat surface of the elongate element is configured and structured to enable a user to tamp a portafilter on the flat surface, the flat surface being located at least along a central part of the elongate element positioned over the bore.

16. The device as claimed in claim 1, wherein the head module further comprises a support.

17. A device adapted for coffee preparation, the device comprising:
   a head portion;
   the head module comprising:
      a first end, a second end and a bore extending therebetween;
      an elongate element extending across the bore at the first end of the head module;
   wherein the elongate element is configured to be disposed less than or equal to 900 mm relative to floor level; and
   wherein the elongate element comprises a flat surface.

18. The device as claimed in claim 17, wherein a height of the elongate element relative to the floor is adjustable between the range of 600 mm to 900 mm.

19. The device as claimed in claim 17, wherein the device is installed in at least one of the group of: a bench, a countertop and a table.

20. The device as claimed in claim 17, wherein the elongate element is adapted to allow a user of the device to tamp coffee on the flat surface.

* * * * *